(12) United States Patent
Peron

(10) Patent No.: US 9,866,141 B2
(45) Date of Patent: Jan. 9, 2018

(54) CHOPPED ELECTRICAL ENERGY CONVERTER

(71) Applicant: FAIVELEY TRANSPORT TOURS, Saint-Pierre-des-Corps (FR)

(72) Inventor: Benoit Peron, Tours (FR)

(73) Assignee: FAIVELEY TRANSPORT TOURS, Saint-Pierre-Des (FR)

( * ) Notice: Subject to any disclaimer, the term of this patent is extended or adjusted under 35 U.S.C. 154(b) by 110 days.

(21) Appl. No.: 14/762,627

(22) PCT Filed: Jan. 22, 2014

(86) PCT No.: PCT/FR2014/050119
§ 371 (c)(1),
(2) Date: Sep. 4, 2015

(87) PCT Pub. No.: WO2014/114878
PCT Pub. Date: Jul. 31, 2014

(65) Prior Publication Data
US 2016/0006363 A1    Jan. 7, 2016

(30) Foreign Application Priority Data

Jan. 23, 2013  (FR) .................................... 13 50580

(51) Int. Cl.
*H02M 7/217* (2006.01)
*H02M 3/335* (2006.01)
*H02M 1/00* (2006.01)

(52) U.S. Cl.
CPC ....... *H02M 7/217* (2013.01); *H02M 3/33561* (2013.01); *H02M 3/33576* (2013.01);
(Continued)

(58) Field of Classification Search
None
See application file for complete search history.

(56) References Cited

U.S. PATENT DOCUMENTS

| 4,642,743 A | * | 2/1987 | Radcliffe | .......... H02M 3/33561 363/21.07 |
| 5,555,494 A | * | 9/1996 | Morris | .................. H02M 3/337 363/132 |

(Continued)

FOREIGN PATENT DOCUMENTS

| CN | 1905342 A | 1/2007 |
| CN | 102638164 A | 8/2012 |

(Continued)

OTHER PUBLICATIONS

International Search Report, dated Jan. 20, 2015, from corresponding PCT application.

(Continued)

*Primary Examiner* — Nguyen Tran
*Assistant Examiner* — Monica Mata
(74) *Attorney, Agent, or Firm* — Young & Thompson

(57) ABSTRACT

A chopped current input electrical energy converter includes at least one conversion module (K1, K2) generating at least one first output signal ($V_{out1}$) and one second output signal ($V_{out2}$) and including: a transformer (10), an input switching stage (20) controlling the transfer of electrical energy to the transformer (10), and at least one first output stage (30) and one second output stage (40), the first output stage (30) generating the first output signal ($V_{out1}$), and the second output stage (40) generating the second output signal ($V_{out2}$); the level of the first output signal ($V_{out1}$) reflected at a primary winding (11) of the transformer (10) is greater than the level of the second output signal ($V_{out2}$) reflected at the primary winding (11) of the transformer (10).

19 Claims, 2 Drawing Sheets

(52) U.S. Cl.
CPC .............. *H02M 2001/008* (2013.01); *H02M 2001/0074* (2013.01); *H02M 2001/0087* (2013.01)

(56) References Cited

U.S. PATENT DOCUMENTS

| | | |
|---|---|---|
| 8,508,959 B2 | 8/2013 | Kwon |
| 2003/0227784 A1* | 12/2003 | Qiao .................. H02M 1/4258 363/21.14 |
| 2009/0021966 A1 | 1/2009 | Jacobson et al. |
| 2011/0031943 A1* | 2/2011 | Green ................ H02M 1/4208 323/205 |
| 2011/0069514 A1 | 3/2011 | Chiba |
| 2012/0113688 A1 | 5/2012 | Liang et al. |
| 2013/0250626 A1 | 9/2013 | Hosotani |

FOREIGN PATENT DOCUMENTS

| | | |
|---|---|---|
| EP | 1 753 118 A2 | 2/2007 |
| FR | 2 973 217 A1 | 10/2010 |
| JP | 2004-260993 A | 9/2004 |
| WO | 2012/073707 A1 | 6/2012 |

OTHER PUBLICATIONS

Chinese Office Action dated Oct. 26, 2016, in corresponding Chinese application (English translation provided).

\* cited by examiner

CHOPPED ELECTRICAL ENERGY CONVERTER

BACKGROUND OF THE INVENTION

Field of the Invention

The present invention concerns a current input chopped electrical energy converter.

More particularly it concerns an electrical energy converter comprising at least two electrically isolated outputs.

Description of the Related Art

A structure of such an electrical energy converter for general use is represented in FIG. 1.

This energy converter comprises in particular a power inductor 1 connected at the input of the converter, a rectification stage 2, a switching stage 3 making it possible to allow or not allow the passage of energy to the primary winding of a transformer 4 and a second rectification stage 5 from which a first output $Output_1$ is taken.

Furthermore, a second output $Output_2$ is generated from the first output $Output_1$. To generate this second output $Output_2$, a second switching stage 6 is mounted to the primary winding of a second transformer, 7 and a third rectification stage 8 is mounted to the output of the secondary winding of the second transformer 7, the second output $Output_2$ being taken at the output of the third rectification stage.

The switching stages operate at a chopping frequency which depends on the levels of the outputs $Output_1$, $Output_2$.

Such an electrical energy converter structure is cumbersome, its volume and its weight being high.

The document "*Design Review: 140W, Multiple Output High Density DC/DC Converter*" provides an energy converter in which the cumbersomeness is reduced. The solution proposed consists in increasing the chopping frequency of the switching means in input stages controlling the transformers.

Nevertheless, the increase in the chopping frequency leads to a reduction of the components if the input stage and does not modify the cumbersomeness of the output stages providing the electrical isolation of the outputs.

The present invention is directed to providing a chopping electrical energy converter structure making it possible to further reduce the cumbersomeness for the input stage and for the output stages.

SUMMARY OF THE INVENTION

To that end, the present invention concerns a current input chopped electrical energy converter, comprising at least one conversion module generating at least a first output signal and a second output signal and comprising:
- a transformer comprising at least one primary winding and at least a first secondary winding and a second secondary winding
- an input switching stage comprising input switching means controlling the transfer of electrical energy to the transformer, and
- at least a first output stage and a second output stage, the first output stage generating the first output signal and comprising first rectification means, and the second output stage generating the second output signal and comprising second rectification means and output switching means actuating the second rectification means.

the level of the first output signal reflected to said at least one primary winding of the transformer being greater than the level of the second output signal reflected to said at least one primary winding of the transformer.

Such a converter structure makes it possible to increase the chopping frequency on the input signal and on the output signals of the first and second output stage, thereby containing fewer passive energy storage power components and fewer transformers than a conventional converter structure. Therefore its volume and its weight are lower relative to the conventional structures for electrical energy converters.

Furthermore, the cost of a converter structure according to the invention is also lower than the cost of a conventional structure.

Thus, the first output signal corresponds to the signal output from the first secondary winding of the transformer rectified by the first rectification means, and the second output signal corresponds to the signal output from the second secondary winding of the transformer rectified by the second rectification means.

According to another feature, the converter comprises at least a first and a second conversion module, the stages of input switching for each conversion module being connected in series together and with a source of current, each conversion module generating the same number of output signals, the first output signals from the conversion modules being linked together and the second output signals from the conversion modules being linked together.

Thus, the first output signals from the conversion modules form a first output signal from the converter and the second output signals from the conversion modules form a second output signal from the converter.

By virtue of the presence of at least two conversion modules, the frequency of the output signals is doubled and the effective currents in the electrical components are reduced both on the input signals and the output signals.

Furthermore, the greater the increase in the number of conversion modules, the higher the frequency of the output signals and the lower the effective currents in the electrical components.

For example, the current source comprises a power inductor.

According to a feature, actuating signals actuating the input switching means and the output switching means of said first conversion module have a predetermined phase shift relative to the actuating signals actuating the input switching means and the output switching means of the second conversion module.

Thus, each output signal of the converter is composed by output signals from the conversion modules, an output signal from a conversion module being generated with an offset relative to an output signal from another conversion module.

For example, the phase shift has a value substantially equal to 360° divided by the number of conversion modules of the converter.

Advantageously, the input switching stage further comprises a switching assistance circuit comprising passive electrical components.

In another example, the input switching stage further comprises a switching assistance circuit comprising actuated power transistors.

Such circuits make it possible to reduce the switching losses of the associated switching means, further increasing the yield of the electrical energy converter.

According to a feature, the converter comprises at least a first electrical energy storage capacitor and a second electrical energy storage capacitor respectively mounted at the output of the first rectification means and of the second rectification means of at least one conversion module.

According to another feature, each output stage respectively comprises an inductor mounted in series respectively with the rectification means.

Still other particularities and advantages of the invention will appear in the following description.

BRIEF DESCRIPTION OF THE DRAWING FIGURES

In the accompanying drawings, given by way of non-limiting example:

DETAILED DESCRIPTION OF THE INVENTION

Figure 1:
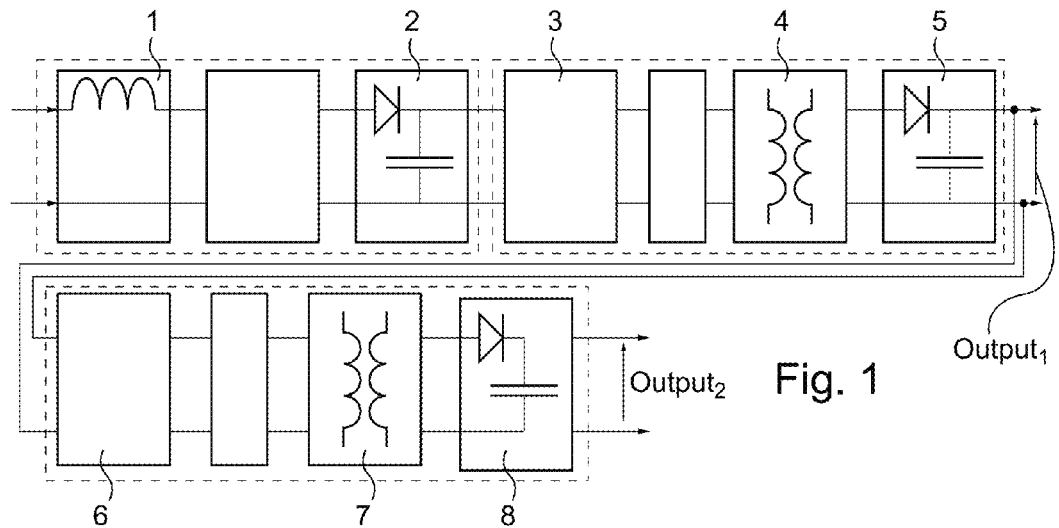
FIG. 1 illustrates an electrical energy converter structure of the prior art.
Figure 2:
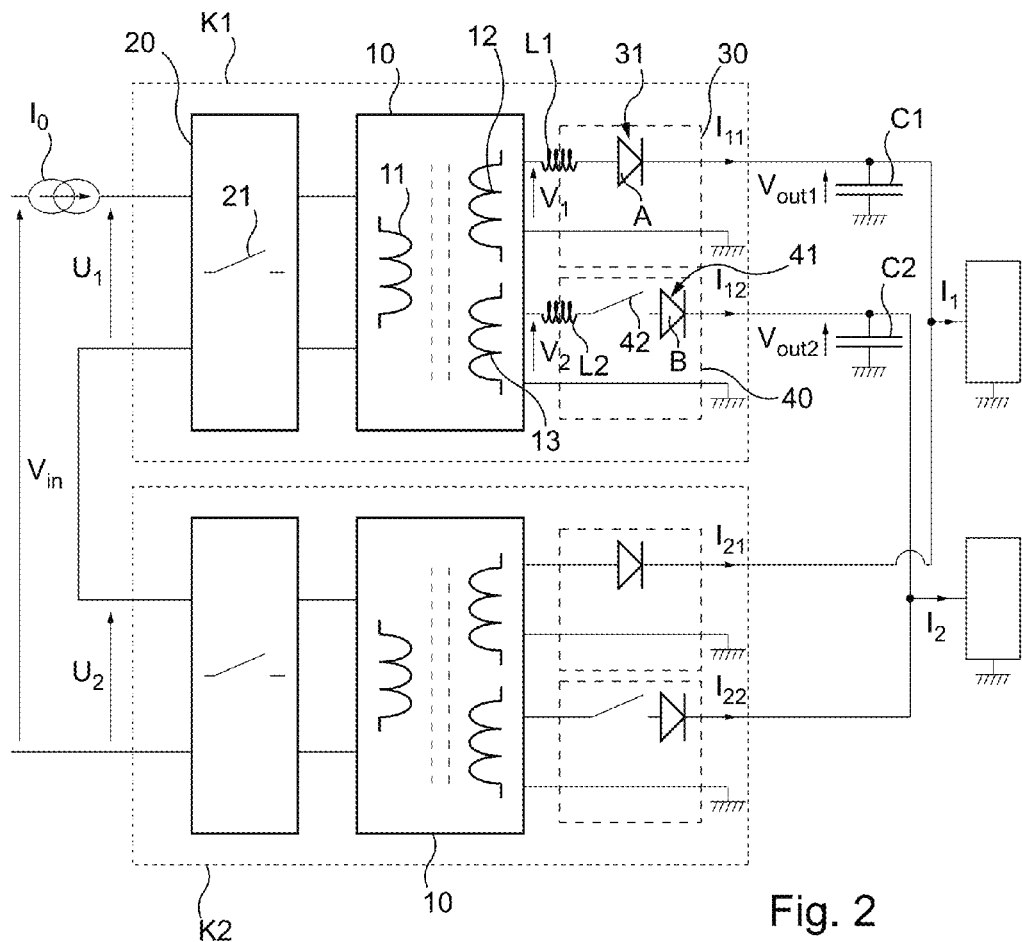
FIG. 2 illustrates an energy converter structure in accordance with an embodiment structure.

With reference to FIG. 2, an electrical energy converter in accordance with the invention will be described.

The energy converter illustrated by FIG. 2 generates two output signals $V_{out1}$, $V_{out2}$, from a signal $V_{in}$ at its input. Here the output signals $V_{out1}$, $V_{out2}$ are voltages.

Of course, an energy converter in accordance with the invention can generate a higher number of output signals.

The described example comprises two conversion modules K1, K2. In this example the conversion modules K1, K2 are identical.

Each conversion module K1, K2 comprises a transformer 10 comprising a primary winding 11, a first secondary winding 12 and a second secondary winding 13. The transformer 10 generates a first output signal from the transformer $V_1$ and a second output signal from the transformer $V_2$, the first output signal from the transformer $V_1$ being taken at the first secondary winding 12 and the second output signal from the transformer $V_2$ being taken at the second secondary winding 13.

Of course, the number of windings of the transformer 10 may be different.

Thus, in other embodiments the number of secondary windings is greater than two. Therefore, the number of output signals from the transformer (and from the converter) is greater than two and equal to the number of secondary windings.

For example, in one embodiment, the transformer comprises one primary winding and four secondary windings. The electrical energy converter then comprises four output signals.

In the described example, each conversion module K1, K2 further comprises an input switching stage 20 comprising input switching means 21.

The input switching stages 20 of each conversion module K1, K2 are connected together in series with a current source $I_0$.

The input switching means 21 are implemented by means of a power switch actuated for opening and closing, for example an IGBT (acronym for "Insulated Gate Bipolar Transistor"), a MOSFET (acronym for "Metal-Oxide-Semiconductor Field-Effect Transistor") or a GTO (acronym for "Gate Turn-Off Thyristor").

Of course, other types of components may be used as a power switch actuated for closing and opening.

The input switching means 21 are configured to control the transfer of electrical energy to the transformer 10. Thus, they operate according to a chopping frequency and an input duty cycle which have a value which depends on the values desired for the first output signal from the transformer $V_1$ and the second output signal from the transformer $V_2$.

Furthermore, each conversion module K1, K2 comprises a first output stage 30 and a second output stage 40.

The first output stage 30 is mounted at the output of the first secondary winding 12 of the transformer 10 and comprises rectification means 31 configured to rectify the first output signal of the transformer $V_1$. This first output stage 30 generates the first output signal $V_{out1}$.

The second output stage 40 is mounted at the output of the second secondary winding 13 of the transformer 10 and comprises second rectification means 41 configured to rectify the second output signal from the transformer $V_2$, as well as output switching means 42 configured to actuate the second rectification means 41.

The second output stage 40 generates the second output signal $V_{out2}$.

The output switching means 42 are implemented by means of a power switch actuated for closing and able to be opened when the current passing through it is substantially zero.

Such a power switch may for example be an SCR (acronym for "Silicon Controlled Rectifier") or an actuated transistor operating as a thyristor for example such as an "IGBT" or a "MOSFET".

Of course, other types of component may be used as a power switch actuated for closing and able to be opened naturally when the current passing through it is zero.

The output switching means 42 operate with a chopped output frequency having a value which depends on the value desired for the second output signal $V_{out2}$.

In this example, the first rectification means 31 and the second rectification means 41 respectively comprise at least a first diode A and a second diode B.

In this example, a first electrical energy storage capacitor C1 and a second electrical energy storage capacitor C2 are respectively mounted at the output of the first rectification means 31 and of the second rectification means 41 of the first conversion module K1.

In the described embodiment, the first output signals from each conversion module K1, K2 are linked together.

First output currents $I_{11}$, $I_{21}$ of each first rectification stage 30 of each conversion module K1, K2 are thus added together to form a first output current $I_1$ of the converter.

In the described embodiment, the second output signals from each conversion module K1, K2 are also linked together.

Second output currents $I_{12}$, $I_{22}$ of each second rectification stage 40 are thus added together to form a second output current $I_2$ of the converter.

Figure 3:
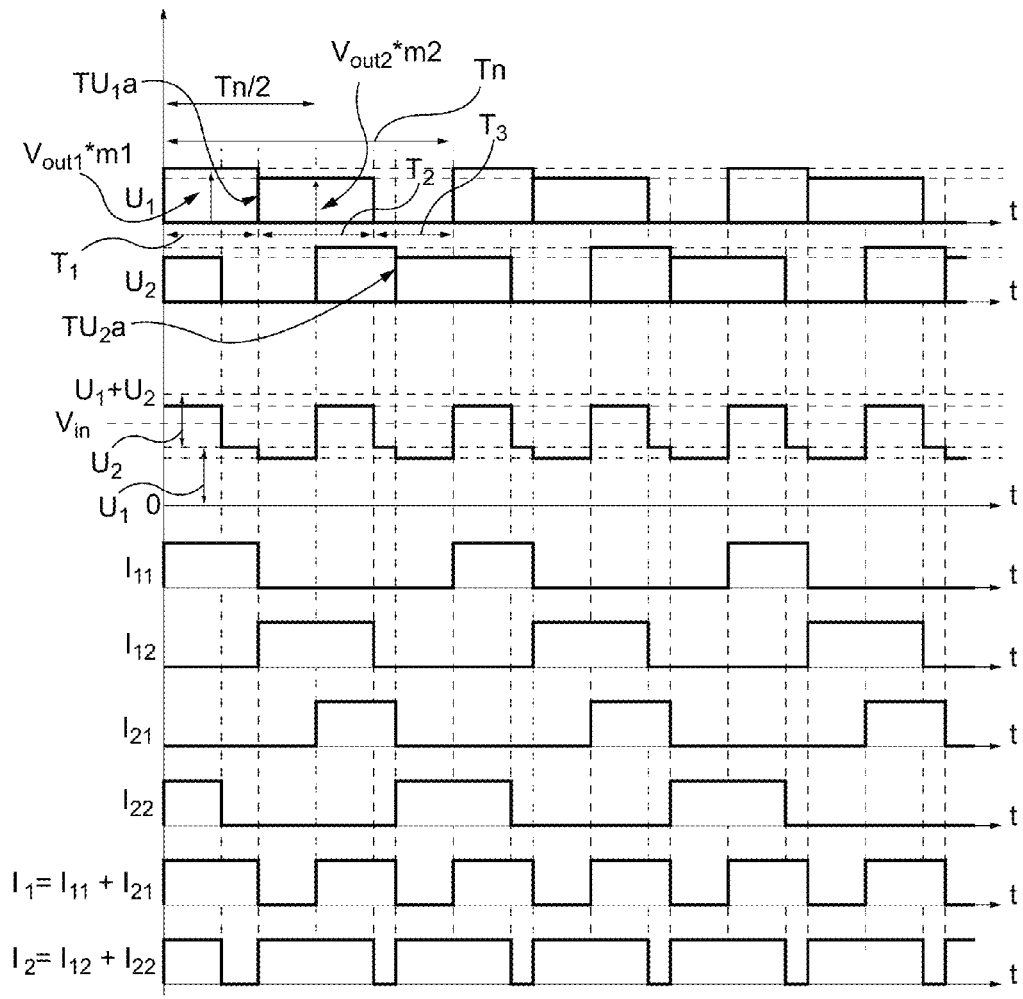
FIG. 3 illustrates curves of the electrical signals in the electrical energy converter of FIG. 2.

These currents are shown in FIG. 3.

The input voltage of the converter $V_{in}$ is divided into two input signals $U_1$, $U_2$ sent to the first and second conversion modules K1, K2 respectively.

The chopping period Tn of the input signals $U_1$, $U_2$ is represented in FIG. 3. In this chopping period Tn, a first fraction $T_1$ corresponds to the generation of the first output signal $V_{out1}$ and a second fraction $T_2$ corresponds to the generation of the second output signal $V_{out2}$.

Thus, in this example, the first fraction $T_1$ of the chopping period Tn is responsible for the generation of the first output currents $I_{11}$, $I_{21}$ and the second fraction T2 is responsible for the generation of the second output currents $I_{21}$, $I_{22}$.

The average value of the first output current $I_1$ of the converter is greater than the average values of the first output currents $I_{11}$, $I_{21}$ of each first rectification stage 30. In the same way, the average value of the second output current $I_2$ of the converter is greater than the average values of the second output currents $I_{21}$, $I_{22}$ of each second stage of rectification 40. Therefore, the frequency value of the output signals is doubled relative to that of a conventional structure and the effective currents are reduced in the power switches and in the passive components such as the electrical energy storage capacitors C1, C2 and the input inductor (not shown) implementing the current source $I_0$.

Thus, the size of the electrical energy storage capacitors C1, C2 respectively situated at the output of said first rectification means 31 and of the second rectification means 41 may be reduced.

Furthermore, the size of the input inductor forming the source of current $I_0$ disposed in series with the conversion modules K1, K2 is reduced.

This contributes to the reduction in the cumbersomeness of the converter structure in accordance with the invention.

As illustrated in FIG. 3, the input signals $U_1$, $U_2$ have a phase shift of 180°, that is to say of half a chopping period Tn. This phase shift value corresponds to 360° divided by the number of conversion modules, here 2.

Thus, the instantaneous sum of the input signals U1, U2 makes it possible to reduce the effective component applied to the terminals of the input inductor providing the current source $I_0$.

In the described embodiment, the switching stage 20 further comprises a switching assistance circuit. An example of a switching assistance circuit is for example the passive circuit for switching assistance described in document FR2972317A.

Of course, other switching assistance circuits may be employed.

The switching assistance circuits make it possible to reduce the excess voltages at the terminals of the input switching means 21 and reduce the losses due to its switching.

In an embodiment, each output stage 30, 40 comprises an inductor L1, L2.

In the described example, the first output stage 30 comprises a first inductor L1 mounted between the first secondary winding 12 and the first rectification means 31, and the second output stage 40 comprises a second inductor L2 mounted between the second secondary winding 13 and the second rectification means 41.

The presence of the first and second inductors L1, L2 makes it possible respectively to spread the first output current $I_{11}$ and the second output current $I_{12}$ over a longer period. Thus the effective value of the output currents $I_{11}$, $I_{12}$ is less than in the case of a conventional topology and the yield of the energy converter is increased.

In other embodiments, the number of conversion modules K1, K2 is different.

Next the operation of the electrical energy converter represented in FIG. 2 will be described.

It should be noted that the value of the first output voltage signal $V_{out1}$ reflected to the primary winding of the transformer 10, that is to say brought back to the primary winding side of the transformer 10 (m1*$V_{out1}$, m1 being the transformation ratio of the first secondary winding 12) is greater than the value of the second output voltage signal $V_{out2}$ reflected to the primary winding of the transformer 10, that is to say brought back to the primary winding side of the transformer 10 (m2*$V_{out}$2, m2 being the transformation ratio of the second secondary winding 13).

Thus, when the output voltage $V_1$ of the first secondary winding 12, brought back to the primary winding side of the transformer 10, has such a value, the first diode A is in a state of conduction.

As the output switching means 42 are in an open state, the energy of the current source $I_0$ passing through the transformer 10 of the first conversion module K1 is then transferred into the first electrical energy storage capacitor C1, in the first fraction $T_1$ of the chopping period Tn.

Thus, for that first fraction $T_1$, the first output signal $V_{out1}$ is generated and reflected or brought back to the primary winding side of the transformer 10 (m1*$V_{out1}$), as well as to the terminals of the second secondary winding 13.

When the output switching means 42 pass into closed state, the second output signal $V_{out2}$ is applied to the terminals of the second secondary winding 13, being also reflected onto the primary winding 11 and the first secondary winding 12.

As soon as the voltage signal reflected to the terminals of the second secondary winding 13 is less than the voltage signal at the terminals of the first primary winding 11, the current in the first diode A and in the first inductor L1 decreases and the current in the second diode B and in the second inductor L2 increases.

The energy of the current source $I_0$ is then shared between the two outputs.

The value of the first and second inductors L1, L2 is chosen such that the average value of the first output current $I_1$ and of the second output current $I_2$ is an integer value at each chopping period Tn.

When the current passing through the first diode A is zero, the entirety of the energy of the current source $I_0$ is conveyed by the second diode B and the output switching means 42 to charge the second energy storage capacitor C2.

Thus, the second output signal $V_{out2}$ is generated during the second fraction $T_2$ of the chopping period Tn.

The voltage reflected to the primary winding side of the transformer 10 is then equal to $V_{out2}$*m2. This voltage is less than the voltage ($V_{out1}$*m1) reflected to the primary winding side of the transformer 10 during the first fraction $T_1$.

This difference between the voltage reflected to the primary winding side of the transformer 10 during the first and second fraction $T_1$, $T_2$ is represented in FIG. 3 on the graph corresponding to the input signals $U_1$ and $U_2$ respectively at the times $TU_1$a and $TU_2$a.

When the input switching means 21 are in a closed state, the primary winding 11 of the transformer 10 is short-circuited and conveys the entirety of the current coming from the current source $I_0$.

Thus, the voltage reflected onto the first and second secondary windings 12, 13 is zero.

At that moment, the current stored in the second inductor L2 discharges into the second energy storage capacitor C2 via the primary winding 11 short-circuited by the input switching means 21. Due to this, the losses due to the switching when the input switching means 21 close are reduced. Thus, the yield of the electrical energy converter is improved.

When the current in the output switching means 42 becomes substantially equal to 0, the output switching means 42 open naturally without generating losses of joules.

The input switching means 21 remain closed over a third fraction $T_3$ of the chopping period Tn in order to ensure a zero average voltage at the terminals of the source of the current $I_0$ over a chopping period Tn.

Thus, the first conversion module K1 no longer supplies energy for the generation of the first output signal $V_{out1}$ and the second output signal $V_{out2}$, the second conversion module K2 being the only one to perform the transfer of energy.

At the end of the third fraction $T_3$, the input switching means 21 open in order to promote the conduction of the first diode A and begin again a new chopping period Tn.

In the example described above, the operation of the second conversion module K2 is identical to the operation of the first conversion module K1.

In the same way, when the number of conversion modules is k, the operation of the k conversion modules K1, K2, . . . , Kk is identical.

It should be noted that when the number of conversion modules K1, K2 increases, the frequency of the output signals increases and the effective currents are reduced. Therefore, the cumbersomeness of the converter reduces and its yield increases.

In another embodiment, the conversion modules K1, K2 are not identical. Thus, for example, the conversion modules generate a different number of output signals.

The invention claimed is:

1. A current input chopped electrical energy converter, comprising:
    at least one conversion module generating at least a first output signal and a second output signal;
    a current source connected to the at least one conversion module;
        a transformer comprising at least one primary winding, at least a first secondary winding and a second secondary winding;
        an input switching stage comprising input switch controlling the transfer of electrical energy to said transformer; and
        at least a first output stage and a second output stage, said first output stage generating the first output signal and comprising a first rectifier, and the second output stage generating the second output signal and comprising a second rectifier, a second electrical energy storage capacitor being mounted at an output of said second rectifier, and an output switch actuating said second rectifier,
    wherein a voltage level of the first output signal reflected to said at least one primary winding of the transformer is greater than the voltage level of the second output signal reflected to said at least one primary winding of the transformer so that as long as said input switch is in an open state,
    when said output switch is in an open state, the energy of said current source is transferred into said first electrical energy storage capacitor, and
    when said output switch passes into closed state, the current through said first rectifier decreases and the current through said second rectifier increases, the energy of said current source being shared between said first electrical energy storage capacitor and said second electrical energy storage capacitor,
    until an entirety of the energy of said current source is transferred into said second electrical energy storage capacitor.

2. The converter according to claim 1, further comprising at least first and second conversion modules, the stages of input switching for each conversion module being connected in series together and with a source of current, each conversion module generating the same number of output signals, said first output signals from the conversion modules being linked together and said second output signals from each conversion module being linked together.

3. The converter according to claim 1, wherein each output stage respectively comprises an inductor mounted in series respectively with the first and second rectifiers.

4. The converter according to claim 2, wherein said current source comprises a power inductor.

5. A converter according to claim 2, wherein actuating signals actuating the input switch and the output switch of said first conversion module have a predetermined phase shift relative to the actuating signals actuating the input switch and the output switch of said second conversion module.

6. The converter according to claim 5, wherein the phase shift has a value equal to 360° divided by the number of conversion modules of the converter.

7. The converter according to claim 1, wherein the input switching stage further comprises a switching assistance circuit comprising passive electrical components.

8. The converter according to claim 2 wherein each output stage respectively comprises an inductor mounted in series respectively with the respective rectifier.

9. The converter according to claim 8, wherein said current source comprises a power inductor.

10. The converter according to claim 3, wherein actuating signals actuating the input switch and the output switch of said first conversion module has a predetermined phase shift relative to the actuating signals actuating the input switch and the output switch of said second conversion module.

11. The converter according to claim 4, wherein actuating signals actuating the input switch and the output switch of said first conversion module have a predetermined phase shift relative to the actuating signals actuating the input switch and the output switch of said second conversion module.

12. The converter according to claim 8, wherein actuating signals actuating the input switch and the output switch of said first conversion module have a predetermined phase shift relative to the actuating signals actuating the input switch and the output switch of said second conversion module.

13. The converter according to claim 9, wherein actuating signals actuating the input switch and the output switch of said first conversion module have a predetermined phase shift relative to the actuating signals actuating the input switch and the output switch of said second conversion module.

14. The converter according to claim 10, wherein the phase shift has a value equal to 360° divided by the number of conversion modules of the converter.

15. The converter according to claim 11, wherein the phase shift has a value equal to 360° divided by the number of conversion modules of the converter.

16. The converter according to claim 12, wherein the phase shift has a value equal to 360° divided by the number of conversion modules of the converter.

17. The converter according to claim 13, wherein the phase shift has a value equal to 360° divided by the number of conversion modules of the converter.

18. The converter according to claim 2, wherein the input switching stage further comprises a switching assistance circuit comprising passive electrical components.

19. The converter according to claim 2, wherein further comprising at least a first electrical energy storage capacitor and a second electrical energy storage capacitor respectively mounted at the output of said first rectifier and of said second rectifier of at least one conversion module.

* * * * *